C. SULFER.
RECORDING MECHANISM.
APPLICATION FILED SEPT. 13, 1909.
1,135,555.
Patented Apr. 13, 1915.
7 SHEETS—SHEET 3.
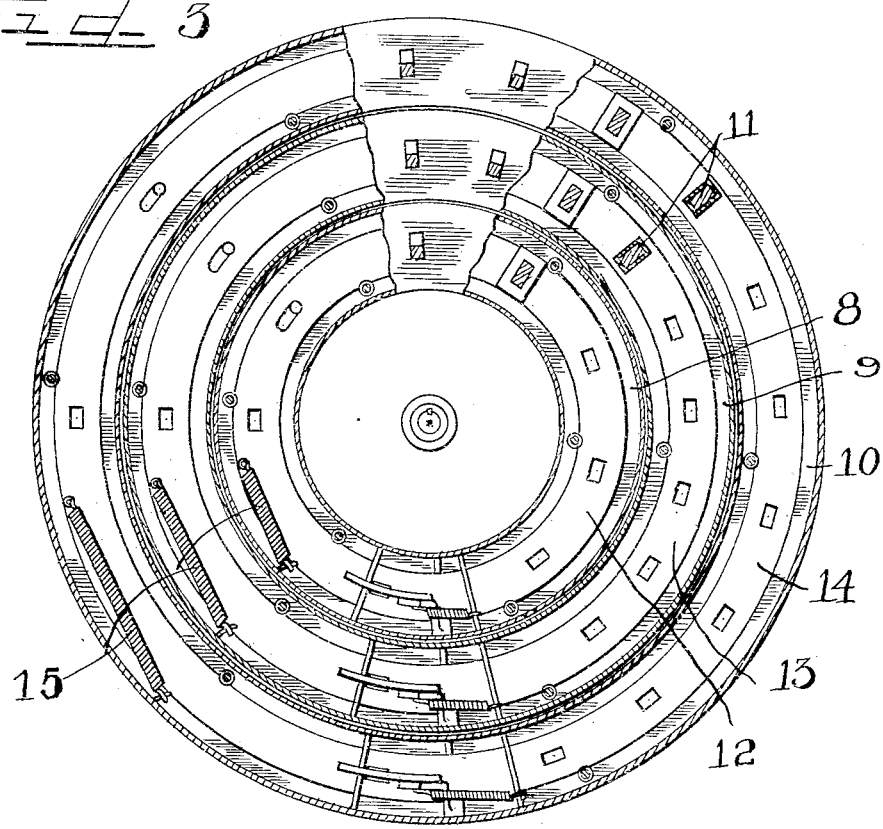
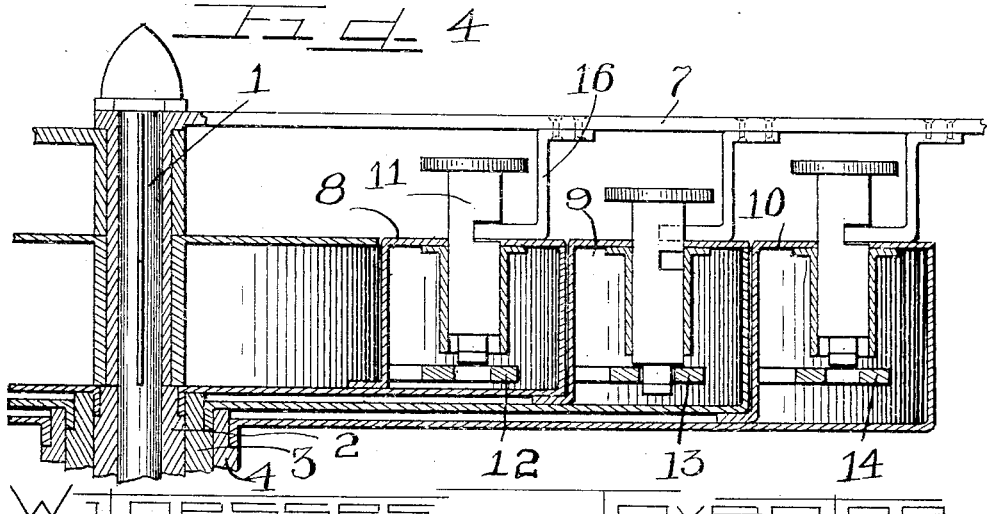

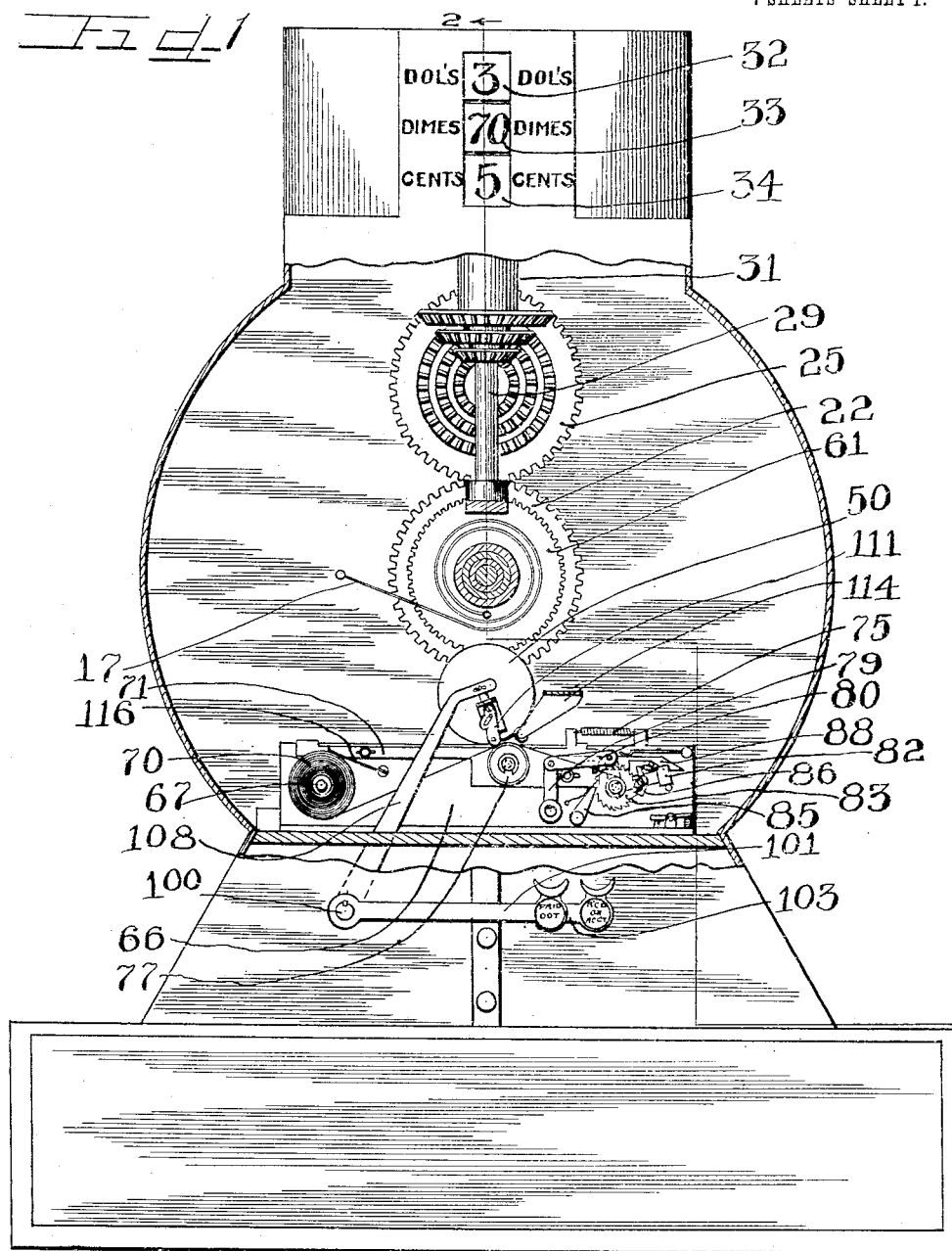

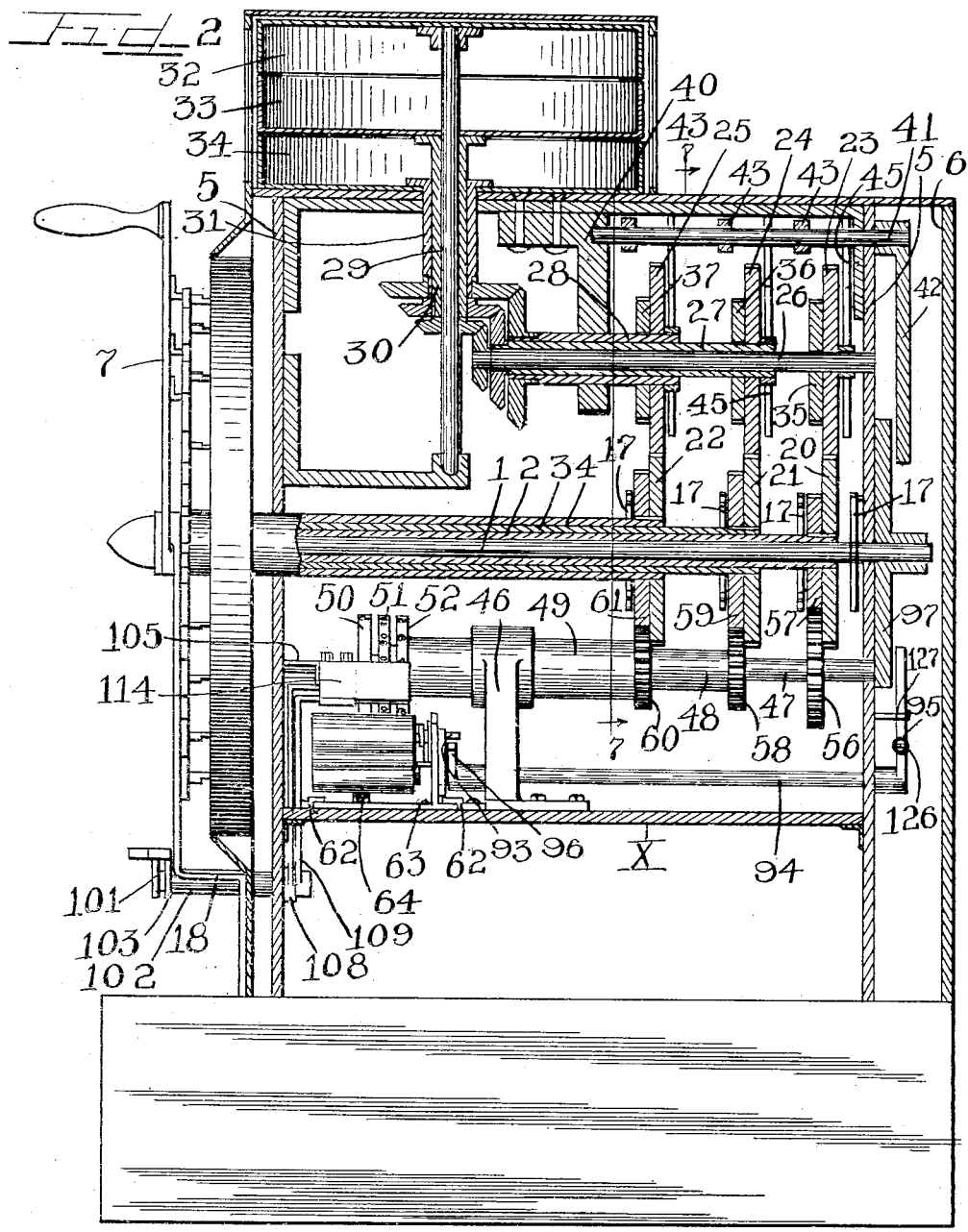

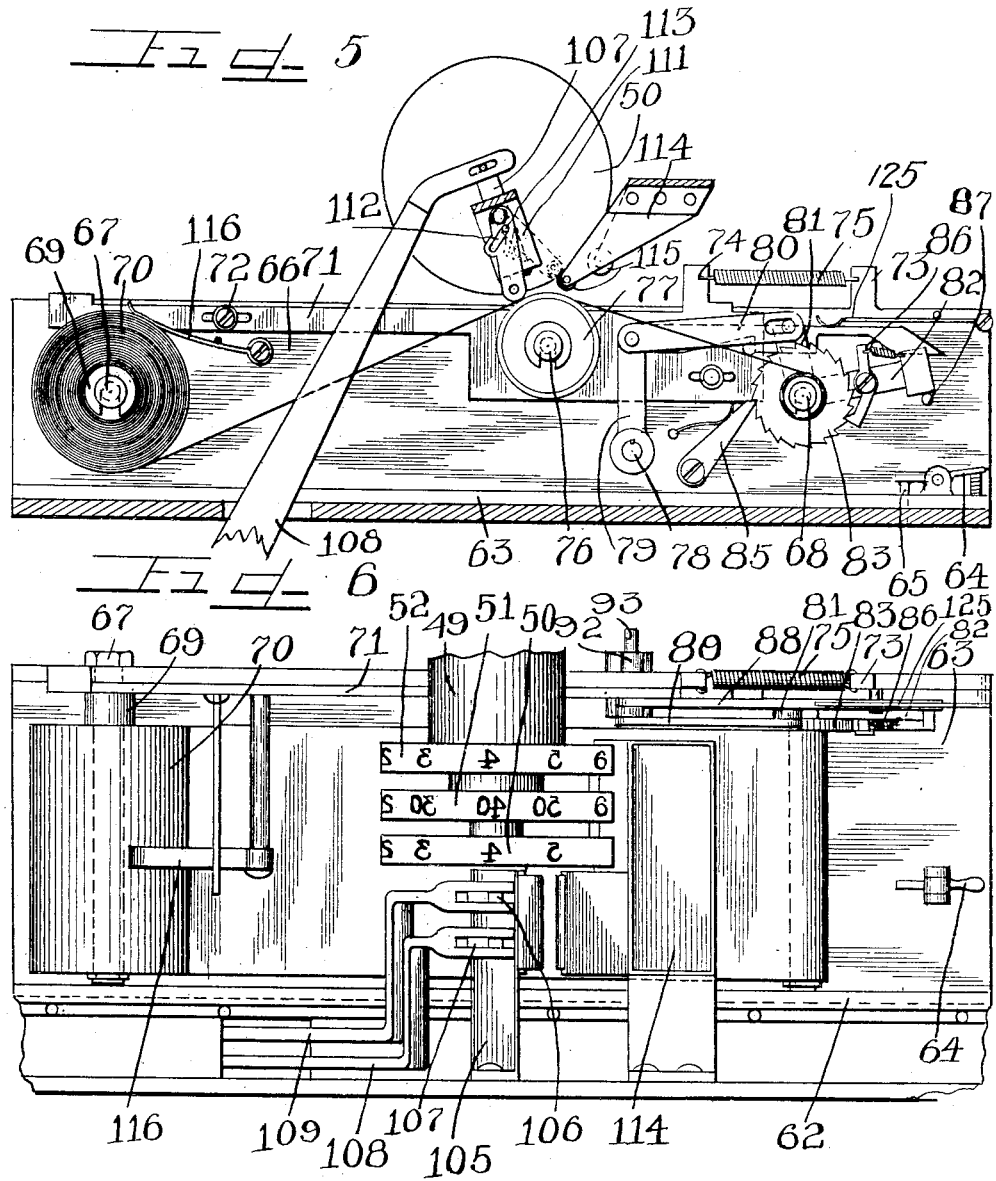

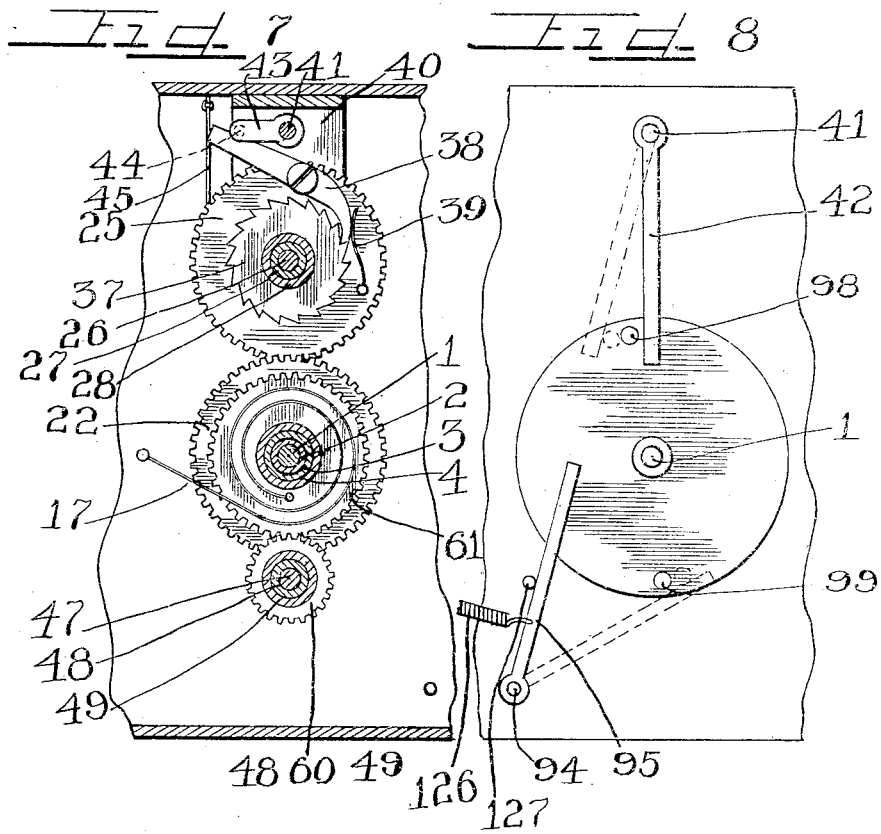

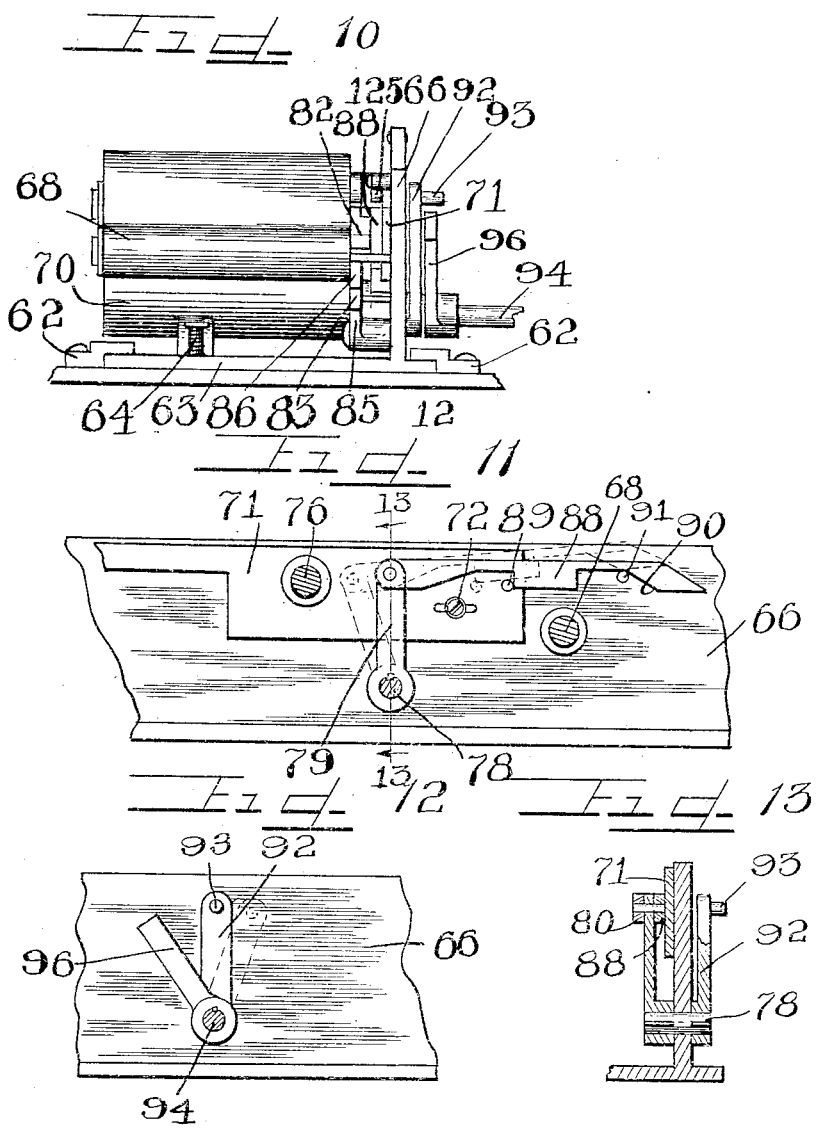

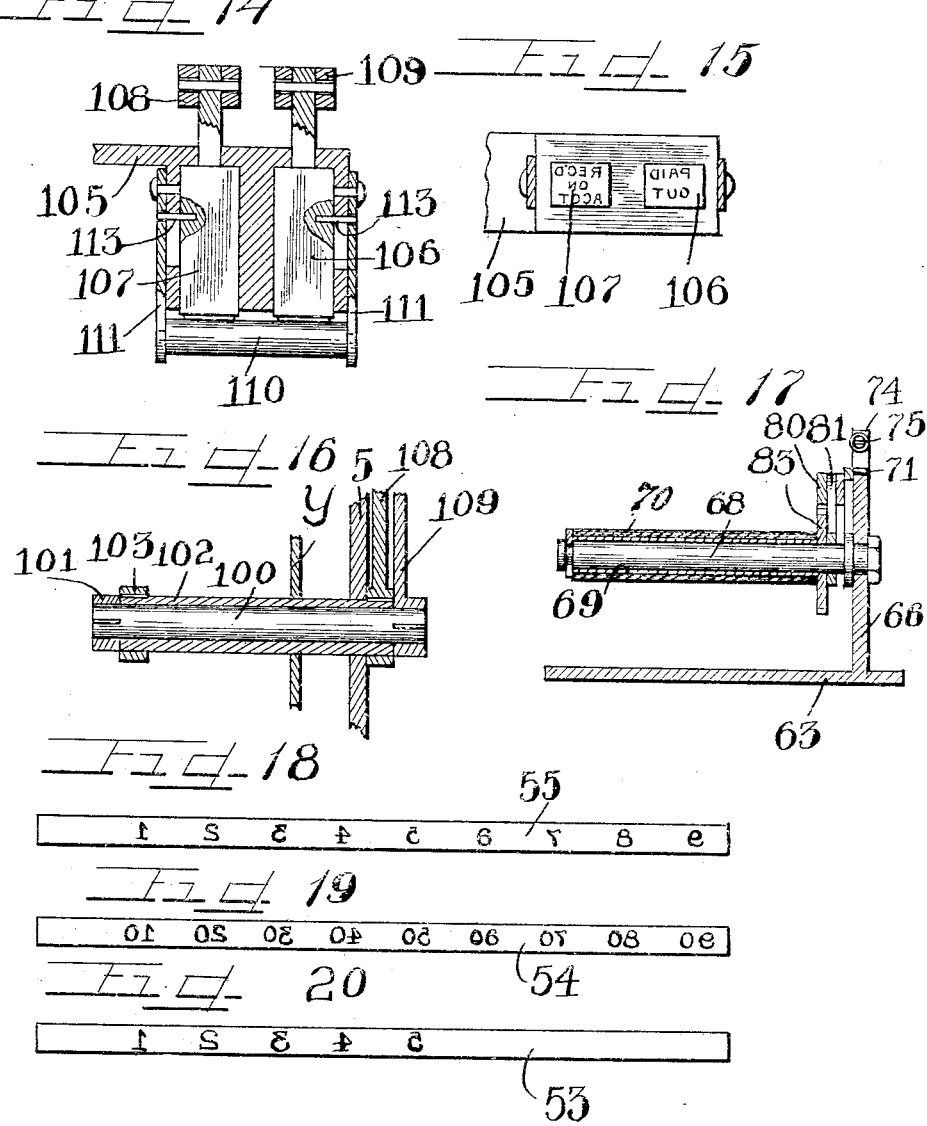

UNITED STATES PATENT OFFICE.

CHARLES SULFER, OF MILWAUKEE, WISCONSIN, ASSIGNOR TO DIAL CASH REGISTER COMPANY, OF MILWAUKEE, WISCONSIN, A CORPORATION OF ARIZONA.

RECORDING MECHANISM.

1,135,555.      Specification of Letters Patent.      Patented Apr. 13, 1915.

Application filed September 13, 1909. Serial No. 517,473.

*To all whom it may concern:*

Be it known that I, CHARLES SULFER, a citizen of the United States, and a resident of the city of Milwaukee, in the county of Milwaukee and State of Wisconsin, have invented certain new and useful Improvements in Recording Mechanisms; and I do hereby declare that the following is a full, clear, and exact description of the same, reference being had to the accompanying drawings, and to the numbers of reference marked thereon, which form a part of this specification.

This invention relates to improvements in printing cash registers and is shown in connection and embodied as a part of my prior inventions as set forth in applications for United States Letters Patent, Serial No. 514,048, for "sales indicator for cash registers", filed on the 21st day of August, 1909, and "key boards", filed on the 2nd day of August, 1909, Serial No. 510,850.

The object of the invention is to provide a recording mechanism for cash registers and analogous machines operated wholly by rotation of the actuating elements.

It is also an object of the invention to afford a recording mechanism adapted to be quickly inserted in, or removed from the machine and in which the renewal of the record strip may be accomplished with the utmost ease.

It is furthermore an object of the invention to afford a construction of the utmost simplicity, strength and durability and in which the rotative actuating element therefor acts also rotatively to expose a visible signal indicating the amount of the transaction.

Finally it is an object of the invention to afford in a rotatively operating cash register a rotatively actuated recording mechanism and a rotatively actuated indicator.

The invention embraces many other novel features, the nature and object of which are hereinafter more fully set forth and consisting in the matters hereinafter described and more fully pointed out and defined in the appended claims.

In the drawings: Figure 1 is a vertical and transverse section of a cash register showing the recording mechanism embodying my invention. Fig. 2 is a section on line 2—2 of Fig. 1. Fig. 3 is an enlarged sectional view taken through the keyboard or operating dials. Fig. 4 is an enlarged fragmentary section of the keyboard or dials. Fig. 5 is an enlarged side elevation of a recording mechanism embodying my invention. Fig. 6 is a top plan view thereof. Fig. 7 is a section on line 7—7 of Fig. 2. Fig. 8 is a view in elevation of a part of the release mechanism. Fig. 9 is a section of the recorder shafts. Fig. 10 is a view in elevation of one end of the recording mechanism. Fig. 11 is an enlarged fragmentary elevation of the side of the machine opposite that shown in Fig. 5. Fig. 12 is a fragmentary section on line 12—12 of Fig. 10. Fig. 13 is a section taken on line 13—13 of Fig. 11. Fig. 14 is an enlarged sectional detail for a part of the printing mechanism. Fig. 15 is a bottom plan view and section of the same. Fig. 16 is an enlarged detail section of one of the paper rolls. Fig. 17 is a similar view of the receiving roll for the printed strip. Figs. 18, 19, and 20, are face views of the printing, numbering or type strips secured around the periphery of the recording wheels.

As shown in the drawings, the cash register is that set forth in my prior application for patent, Serial No. 514,048, filed August 21st, 1909, in which concentric shafts 1, 2, 3, and 4, are journaled horizontally in a suitable frame 5, inclosed in a casing 6, and are denominated respectively the actuating shaft, the dollar shaft, the dime shaft, and the penny shaft. On the inner or actuating shaft at its outer end is a crank 7, and on the other of said shafts respectively are concentric dials 8, 9, and 10, each comprising a casing in which are set push pins or keys 11, marked each successively and respectively from 1 to 5 on the dollar shaft, from naught to 90 on the dime shaft by tens, and from naught to 9 successively on the penny shaft. Within the casing in each dial is provided a detent for each of the pins on said dial and in the present instance, said detent comprises what I may term a shifting ring 12, 13, and 14, apertured to receive and retain the inner end of the push pin when pressed inwardly and to hold the same through the tension of springs 15, as shown in Fig. 3. Each of the push pins, as shown, is notched in its side at a point coinciding approximately with the face of the dial when said push pin is in normal position, said notch, however, lying within the casing when said push pin is held at its inward position. Secured on the crank 7, on the actuating shaft 1, are depending brackets 16, the ends of which are directed parallel the face of said dials and of a size to pass through said notches without contact when the push pins are in their normal position, but which engage the push pin to rotate the dials and the respective denomination shaft 2, 3, or 4, when the push pin is held inwardly by the shifting ring, as shown in Fig. 4. By this arrangement the crank which is normally supported in the position shown in Fig. 2, by means of a spring 17, acts to rotate each or any of said dials when swung downwardly a distance dependent on the position of said push pin on the dial, said distance of rotation being as shown, limited by the stop or bracket 18, secured on the face of the machine and whereby the rotation of said dials is limited to 180 degrees approximately.

Any suitable means may be employed to shift the shifting rings 12, 13, and 14, to release the push pins at the limit of travel in counting to set the machine for another operation. This, however, is fully explained in my prior applications aforesaid and forms no part of this invention. Rigidly secured on each of said shafts is a spur gear 20, 21, and 22, which mesh with the actuating gears 23, 24, and 25, journaled on the actuating shafts 26, 27 and 28, for the indicators to rotate the same from said money shafts. Said indicator shafts 26, 27, and 28, are each provided with a bevel gear meshing respectively with the corresponding bevel gears of the same diameter secured on the shafts 29, 30 and 31, on which are secured rotative indicators 32, 33, and 34, the periphery of each of which is marked appropriately to correspond with the corresponding numbers on the keyboard and which, through the medium of said gears, is shifted as the respective dials return to normal. This is accomplished by securing said gears 23, 24, and 25, rotatively on the respective shafts and rigidly securing on the same shafts and adjacent thereto ratchet wheels 35, 36, and 37 respectively. Secured on each gear wheel is a levered pawl 38, adapted to engage the teeth of said ratchet and held in engagement therewith by means of a spring 39. The teeth of said ratchet are directed so that the gear wheels may rotate freely on the shaft as the dials rotate downwardly in counting. When the gears rotate in the opposite direction, however, during the reverse rotation of the gears on the money or dial shaft, the pawl engages the ratchet rotating the indicator shafts thereby a distance to correspond with the travel of the money or dial shafts, thus causing the indicator wheels to expose the respective numbers at the view apertures in the casing shown in Fig. 1, that correspond with the transaction.

Journaled in suitable brackets 40, in the top of the frame is a shaft 41, which projects through the rear frame plate and is provided at its end with a depending lever or arm 42, and is provided at a point adjacent each of said pawls with an arm 43, provided with a laterally directed pin 44 shown in dotted lines in Fig. 7, adapted to engage the tail of the pawl 38, to release the same when the arm 42, is actuated permitting said indicators to return to neutral under the action of springs 45, secured on the respective shafts.

Journaled in the rear frame plate and in an upwardly directed bracket 46, secured on the bottom of the frame are nested or concentric recorder shafts 47, 48, and 49, for dollars, dimes and cents respectively, which extend parallel with and below the money or dial shafts 2, 3, and 4. On the forward end of each of said recorder shafts are the recording printing wheels 50, 51, and 52, for dollars, dimes and pennies respectively. Extending around each of the said recording printing wheels are metallic or other printing or type bands 53, 54, and 55, respectively shown in Figs. 18 to 20 inclusive, and applied to the dollar, dime and penny recording wheels respectively.

Owing to the number of digits on the dollar dial and dollar recording printing wheel 53, being less than ten, it is unnecessary to rotate said wheel more than 180 degrees, though, owing to the small circumference of said wheels, the dime and penny wheel may complete one revolution. To accomplish this, gear wheels 56 and 57 of equal size and having an equal number of teeth are secured upon the dollar shaft 2, and dollar recording shaft 47, so that said shafts rotate equal distances. In a similar manner a gear wheel 58, is secured on the dime recorder shaft 48, and meshes with a gear wheel 59, of twice the circumference on the dime shaft, and in a similar manner a gear wheel 60, is secured upon the penny shaft 49, and meshes with a gear wheel 61, of twice the circumference on the penny shaft, thus a rotation of 180 degrees on either the penny or dime shaft causes a complete rotation of the penny and dime printing and recorder shafts and wheels.

The tape or paper actuating mechanism is removably secured in operative relation with said printing recorder wheels. For this purpose, as shown, clamping or guide plates 62, are secured on the base X, of said frame in parallel relation, and facing inwardly and transversely the machine and slidably engaged therein is the base plate 63, on which said tape or paper actuating mechanism is carried. As shown, a spring latch 64, is engaged on said base plate 63, and actuates a bolt 65, which projects through said base plate and into the frame plate X. Retraction of said latch permits the paper or tape carrying mechanism to be withdrawn as a whole. Extending upwardly along the rear or inner edge of said base plate is an integral web or flange 66, and rigidly secured therein are horizontal spindles or shafts 67 and 68. On said shaft 67, is a rotative sleeve 69, on which is secured the roll of paper or tape 70, adapted to receive the printed record. Slidable longitudinally on said frame bar or flange 66, is a plate or bar 71, which is secured thereto by means of screws, rivets or other similar means 72, extending through slotted apertures in said sliding bar into said flange shown in Fig. 5. Extending upwardly from said frame bar or flange 66, at one end thereof is a projection 73, and extending upwardly from said sliding bar 71, is a corresponding projection 74. A pulling spring 75, is connected at its ends to said projections and acts at all times to hold said sliding bar at the forward limit of its movement. Secured on said sliding bar is a spindle 76, on which is loosely journaled a roller 77, the surface of which extends upwardly into close relation with the recording printing wheels and acts to hold the paper or tape 70, while the impression is being made. Means are provided for actuating said sliding bar and printing roll 77, to move the same to and from the printing wheels, such movement acting also to wind up the paper on the receiving roll 68. As shown, a shaft 78, extends through said frame flange or bar and on the forward side thereof or that adjacent the rolls is provided with an upwardly extending arm 79, at its upper end pivotally connected with one end of a link 80, the other end of which pivotally engages the shorter end 81, of the arm of a bell crank secured on said shaft, the longer end 82, of which is directed rearwardly and is weighted. Secured on said spindle 68, for the receiving roll is a ratchet wheel 83, which is rigidly secured on a sleeve 84, which fits, and is freely rotatable on said spindle.

Secured upon the frame bar or flange 66, is a pawl 85, which engages said ratchet wheel 83, to hold the same against the tension of the paper or tape, and pivotally secured on said weighted arm 82, of said bell crank is a spring controlled pawl 86, which also engages said ratchet teeth, but permits said weighted end of the bell crank to swing upwardly without material resistance and in returning acts to wind up the paper on said spindle or sleeve. As shown, a stop pin 87, is secured in said frame bar and serves as a stop to limit the further downward movement of the bell crank. Also secured to the arm 79, on the shaft 78, is an actuating bar 88. This, as shown, extends over the shaft 68, provided with a right angled shoulder on its under side adapted to engage a pin or projection 89, set in the sliding bar 71, so that as the shaft 78, is rotated the bell crank is swung rearwardly simultaneously actuating the sliding bar 71. As shown also, said actuating bar 88, is provided with an inclined face 90, on its under side adapted to slide upwardly on a pin or projection 91, set in the frame bar 66, so that as the sliding bar reaches the limit of travel and receives the impression from the printing wheels, the same is released, carrying the printing roll out of engagement with the printing wheels and winding up the tape or paper by the action of said weighted bell crank. A spring 125, bears on said actuating bar and holds the same at all times on the projection 91. Means are provided for actuating said shaft 78. For this purpose, a crank arm 92, is secured on said shaft on the rear side of said frame bar 66, and is provided at its upwardly directed extremity with a pin 93, extending therefrom. Journaled in the rear frame plate and the bracket 46, is a rotatable shaft 94, which on the rear side of the frame plate is provided with an upwardly directed arm 95, and adjacent said crank arm 92, is provided with an upwardly directed arm 96.

Set in the wheel 97, on the actuating shaft, and on the outer side of the main frame plate, are pins 98, and 99, the one to engage and actuate the arm 42, on the shaft 41, to release the indicators, the other to engage and actuate the arm 95, on the shaft 94, to actuate the shaft 78, for the purpose of shifting said actuating bar 88, and the sliding bar 71, to bring the impression roll beneath the printing wheels. A pulling spring 126, is attached to said arm 95, adapted to retract the same and shaft 94, to normal and a stop 127, arrests the arm when it reaches normal position.

Means are provided for indicating the character of the transaction upon the printed strip. For this purpose, as shown, a shaft 100, extends through the front of the casing Y, and front wall of the cash register frame 5, and is provided at its outer end with a lever 101, secured thereto, having on its free end a button or head for manual engagement, marked "Pain Out." Rotatably secured on said shaft 100, is a sleeve 102, also extending through said casing and frame plates having on its outer end a lever 103, rigidly secured thereto and parallel the lever 101, and marked on the outer end "Received on Account."

Supported upon a bracket 105, secured on the inner face of the front frame plate 5, are sliding type bars 106 and 107, positioned directly above the impression roll 77, when in printing position, as shown in Figs. 1 and 5. The lever 108, is bent at its inner end and bifurcated to loosely engage the type bar 107 and the lever 109, is likewise bent to loosely engage the type bar 106, so that actuation of either of said levers 101 or 103 acts to throw the corresponding type bar down upon the paper or tape to print thereon.

Means are provided for inking said type. For this purpose, as shown, an inking roll 110, is supported upon links 111, pivoted at their upper ends on the brackets for said type bars, as shown in Figs. 1, 5 and 14, and as shown, each of said links is provided with an oblique slot 112, shown in Fig. 5, into which projects a pin 113, secured in the side of the respective type bars so that when the levers are actuated to swing said type bars downwardly into printing position, said links are swung upwardly across the face of the type and out of the path of their travel as shown in Fig. 5. Any suitable means may be employed for inking the recording wheels. As shown an inking font or tank 114, is supported in any suitable manner in operative relation with the printing wheels and discharges to an inking roll 115, of any suitable material which bears against the face of the type wheels, the ink being spread by the spreading roll 115, as shown in Fig. 5.

For the purpose of holding the roll 70, from unwinding too rapidly and to maintain a tension on the paper or tape at all times, a spring 116, is supported in any suitable manner to maintain a constant pressure upon the roll sufficient for the purpose.

The operation is as follows: In registering any transaction, the proper push buttons 11, are pressed inwardly to correspond with the transaction. If, for instance, the transaction amounted to three dollars, seventy five cents ($3.75), the push button marked 3, on the dollar dial would be pushed inwardly as would also the push button marked 70, and 5 on the dimes and cents dials respectively. The crank 7, then being swung around the dial, engages the push buttons so pressed inwardly, sweeping the dials around to the stop afforded by the bracket 18, thus rotating each dial and its shaft a fraction of a revolution corresponding with the position and amount of the push pins or keys engaged. This rotation of one or more of the money shafts rotates the gears 23 to 25, on the indicator shafts and when the crank 7, is released the return rotation of the shafts and dial actuates the indicators 32, 33 and 34, because of the ratchet wheels on the respective indicator shafts being engaged by the pawls on the gears. The visible indication of the transaction is effected upon the return of the dials to normal and such visible indication is maintained in full view of the customer until when again actuating the crank the pin 99, engages the depending arm 42, to release the pawls and permit the indicators to return to normal under the action of their springs. During the forward rotation of the dials when actuated by the crank 7, the gears on the dial or money shafts which mesh with the corresponding gears on the recorder shafts cause corresponding rotation of the recorder shafts until the numerals marked on said recording wheels corresponding with the push pins actuated on the dials or keyboard are brought into alinement for printing just before the limit of rotation of the dials is reached. At this moment the pin 98, on the disk 97, on the crank shaft engages the arm 95, throwing the same downwardly as shown in Fig. 8, and thereby actuating the shaft 94, and arm 96, carried thereby at the proper time engages the pin 93, and actuating arm 92, and rotates the shaft 78, actuating the crank 79, which simultaneously lifts the weighted end of the bell crank and adjusts said shifting bar 88, thereby actuating the shifting bar 71, projecting the impression roll over which the paper or tape leads against the printing faces of the type on the printing wheels, and, of course, owing to the tension thus brought on the paper or tape unwinding a portion of the tape or paper from the roll 70. Just at the end of the recording operation and after the roll has been unwound the adjusting bar 88, is released from the pin 89, of the sliding bar 71, by the cam face 90, and pin 91, which permits the springs 75, to return the sliding frame to normal which adjusts the rollers 77 and tape out of engagement with the recording rollers permitting said recording rollers to return to normal without reversely winding the strip.

Upon releasing the crank 7, the springs on the respective money shafts act promptly to return the money shafts and dials to their normal position, and also to reverse the recording printing wheels to neutral. During such movement, the spring on the shaft 94, returns said shaft and arm 95, to normal and simultaneously the weight on the bell crank returns shaft 78, and crank arm 92, to normal and actuates the pawl 86, to rotate the winding roller 68, which winds the slack tape thereon and pulls the tape tight over the impression roller. Of course, the stop pin 87, for the weighted end of said bell crank is so positioned as to permit said bell crank to maintain at all times a slight tension on the paper. When it is desired to record that the amount received is received on account or that a certain sum is paid out, the appropriate lever 101 or 103 is actuated prior to actuating the crank 7. This depresses the appropriate type bar to make the impression on the tape after which actuation of the crank 7, operates the recording mechanism to make the record in alinement with the impression of the type bars. Of course, any suitable number of levers and type bars may be used to meet any special requirement.

When it is desired to remove the tape or paper from the rolls or to renew the same, the tape carriage or frame may be quickly removed by releasing the latch 64, and the paper may be readily slipped from the spindles and a new roll inserted, if desired.

Any desired arrangement for view apertures in the casing or frame may be provided and other actuating mechanisms may be employed for the printing rolls and paper feed, if desired, for I have described but one of very numerous constructions and arrangements to embody my invention. I therefore do not propose limiting this patent otherwise than necessitated by the prior art, but purpose claiming broadly any arrangement or mechanism operated by rotation to actuate, indicate or record in a cash register.

I claim as my invention:

1. In a cash register, concentric actuating dials, concentric dial shafts connected thereto, printing means embracing a plurality of coaxial shafts, appropriated to different money denominations, gears connecting the same and said dial shafts, a printing wheel on each having numerals upon the face, rotative means for bringing the numerals on the respective wheels, into alinement for printing to correspond with the transaction to be recorded, and an impression roll acting to project the paper or tape against the printing face of the wheels.

2. In a cash register, printing means embracing a plurality of concentric shafts appropriated to different money denominations, a printing wheel on each, having numerals upon the face, rotative means for bringing the numerals on the respective wheels into alinement for printing to correspond with the transaction to be recorded, means acting to feed a strip to receive the impression, an impression roll acting to press the strip against the printing face of the wheels, and printing type adapted to print upon the strip before it is pressed against the printing wheels.

3. In a cash register, printing means embracing a plurality of printing wheels, each appropriated to a different money denomination and having numerals upon its face, means for bringing the numerals on the respective wheels into alinement for printing to correspond with the transaction to be recorded, means for feeding a recording strip an impression roll acting to project the strip against the printing face of the printing wheels and to assist in shifting or feeding the strip, printing type adapted to print upon the strip before the strip is pressed against the printing wheels, and means for actuating said printing type.

4. In a cash register, concentric interfitting rotatable key boards, concentric shafts connected thereto, printing means embracing a plurality of printing wheels, each appropriated to a different money denomination and having numerals upon its face, gears connecting the same and said concentric shafts, means for bringing the numerals on the respective wheels into alinement for printing to correspond with the transaction to be recorded, means for feeding a recording strip, an impression roll acting to project the strip or tape against the printing face of the wheels and to assist in shifting or feeding the strip, and means maintaining tension on the strip.

5. A machine of the class described embracing concentric interfitting rotatable keyboards, concentric rotative shafts actuated therefrom, rotative indicators actuated from said shafts, and a printing mechanism also operated from and by said shafts.

6. A machine of the class described embracing a rotatable keyboard, rotative shafts actuated therefrom, rotative sight indicators actuated by said shafts on the return rotation of the shafts to normal position, and a rotative printing mechanism also operated from said shafts.

7. In a machine of the class described a keyboard comprising a plurality of concentric rotative dials, means adapted to selectively rotate the dials, concentric rotative shafts actuated by said dials, rotative sight indicators selectively actuated from said shafts as the shafts return to their normal position, printing mechanism also operated from and by said shafts, and a feed mechanism for the printed record.

8. In a machine of the class described a keyboard, rotative shafts operated thereby one for each money denomination, a rotative sight indicator for each denomination operated by the respective shafts on their return rotation to normal position, and a printing mechanism operated from each shaft and capable of acting simultaneously to record each complete transaction.

9. In a machine of the class described a keyboard, rotative shafts actuated therefrom, printing mechanisms actuated from said shafts, means acting to feed a recording strip, an impression roll adapted to project the recording strip against the printing mechanism at the limit of rotation of said shafts in one direction, indicators actuated from said shafts during the reverse rotation thereof, and mechanisms acting to simultaneously release the indicators and actuate the printing mechanisms.

10. In a machine of the class described a keyboard comprising concentric interfitting dials, rotative concentric shafts actuated therefrom, printing mechanisms actuated from said shafts, means acting to feed a recording strip, an impression roll adapted to project the strip against the printing devices near the limit of rotation of said shafts in one direction, and rotative indicators actuated respectively from said shafts during the reverse rotation thereof to indicate the amount registered.

11. In a machine of the class described a keyboard, rotative shafts one for each money denomination, actuated therefrom, printing mechanisms actuated from said shafts and embracing printing wheels and means acting to feed a recording strip, an impression roll adapted to project the printing strip against the printing wheels near the limit of rotation of said shafts in one direction, a rotative indicator actuated from each of said shafts during the reverse rotation thereof, and means for winding up the recording strip automatically after each impression.

12. In a machine of the class described, rotative dials, rotative shafts operated by said dials and appropriated to different money denominations, a rotative indicator and a rotative printing wheel for each shaft, each operatively connected with its shaft to indicate and to print the amount of the transaction in the denomination for which the shaft is appropriated, and means acting to simultaneously release the indicator and actuate the printing wheels.

13. In a cash register concentric interfitting dials, each appropriated to a different denomination of coin, a shaft for each denomination, and connected to one of said dials, a rotative sight indicating wheel and a printing wheel, each for that denomination movably connected therewith, means rotating the shaft to an extent varying with the amount to be recorded in that denomination and operative connections between each shaft and the indicator and its printing wheel whereby the same are adjusted, the one to indicate and the other to print the appropriate amount.

14. In a machine of the class described rotative money shafts, co-axial dials, one secured to each shaft, appropriated to dollars, dimes and cents respectively, push pins on said dials each appropriated to a digit of that denomination, a crank adapted to engage the actuated push pins to rotate said shaft, printing means positively driven from said shafts, rotative indicators likewise driven from said shafts, means operated by the crank for releasing the indicators simultaneously with the making of the record, and a tension mechanism for rolling up the printed record as made.

15. In a machine of the class described rotative co-axial money shafts appropriated to dollars, dimes and cents respectively, co-axial dials, one secured to each shaft, push pins on said dials each marked with a digit of that denomination, a crank adapted to engage the push pins actuated to rotate said shafts, springs acting to return the shafts to normal after each actuation, printing means positively driven from each shaft, a rotative indicator likewise driven from each shaft when the shaft is returning to normal, means acting to hold a recording strip, a feed mechanism therefor and means operated by the crank for releasing the indicators simultaneously with making the record.

16. In a machine of the class described rotative money shafts, co-axial dials, one secured to each shaft, push pins on said dials each appropriated to a digit of that money denomination, a crank adapted to engage the push pins actuated to rotate said shafts, means automatically returning each shaft to normal after each actuation, rotating printing means positively driven from said shafts, rotative sight indicators likewise driven from said shafts, when returning to normal, and means operated by the said crank for releasing the indicators simultaneously with making the record.

17. In a sales recording device of the class described concentric interfitting, rotating dials, concentric shafts connected thereto, and a recording mechanism operated by rotation of the dials to make a printed record of the amounts registered.

18. In a device of the class described actuating dials, shafts driven thereby, printing wheels on said shafts, impression mechanism for pressing a recording strip against the printing wheels, and printing type adapted to print upon the strip before the same is pressed against the printing wheels.

19. In a sales recording mechanism concentric dials, concentric shafts connected thereto, concentric shafts geared thereto, printing wheels on said shafts and an impression roller adapted to force a strip of record material against the printing wheels.

20. In a device of the class described actuating dials, shafts driven thereby, printing wheels on said shafts, impression mechanism for pressing a recording strip against the printing wheels, said mechanism adapted to feed the printing strip by the recording operation means adapted to print upon the strip before the same is pressed against the printing wheels and mechanism for winding up the fed strips.

21. In a device of the class described concentric interfitting dials, concentric shafts connected thereto, concentric recording shafts, gears connecting the dial shafts and the recording shafts, printing wheels on the recording shafts and mechanism for pressing a recording strip against the printing wheels.

22. In a sales recording mechanism concentric dials, concentric shafts connected thereto, concentric shafts geared thereto, printing wheels on said shafts, an impression roller adapted to force a strip or record material against the printing wheels, said impression roller adapted to feed the record strip and mechanism for taking up the slack after the strip has been fed by the impression roller.

23. In a device of the class described concentric and interfitting actuating dials, concentric printing wheels geared to rotate by rotation of the dials and a mechanism for pressing a recording strip against the wheels.

24. In a device of the class described concentric and interfitting actuating dials, concentric shafts driven thereby, concentric printing wheel on said shafts, impression mechanism for pressing a recording strip against the printing wheels, springs for automatically returning the impression mechanism to normal and means acting to print upon the strip before the same is pressed against the recording strip.

25. In a printing mechanism rotatable recording wheels, a mechanism supporting a strip to receive the impressions from the printing wheels, reciprocating printing devices for printing the nature of the transaction on the strip, means for reciprocating the mechanism for pressing the strip against the printing wheels and to feed the recording strip and mechanism for winding the recording strip thus fed.

26. In a device of the class described concentric interfitting dials, concentric shafts connected thereto, concentric recording shafts, gears connecting the dial shafts and the recording shafts, printing wheels on the recording shafts, mechanisms for pressing a recording strip against the printing wheels, an automatically operating release mechanism for releasing the pressing mechanism and a spring for returning the same to normal.

27. In a device of the class described concentric and interfitting actuating dials, concentric printing wheels geared to rotate by rotation of the dials, a mechanism for pressing a recording strip against the wheels, and means operated by rotation of the dials for actuating said mechanism to press the recording strip against the wheels when the dials have been adjusted to their limit of rotation.

28. In a device of the class described rotating dials, printing wheels rotatable therewith, mechanism for adjusting a strip to take an impression from the printing wheels when the same are rotated to printing position, printing type acting to print upon the strip before said mechanism adjusts the same against the printing wheel, and an independent inking mechanism for the printing wheels and printing type.

29. In a device of the class described concontric shafts, an actuating lever secured to one, concentric and interfitting dials secured to the other shafts, concentric recording shafts parallel the dial shafts, printing wheels thereon, gears connecting the sets of shafts except the lever shaft a disk on the lever shaft and adapted to rotate with the shaft and a mechanism actuated by said disk for forcing a strip against the printing wheels.

30. In a device of the class described concentric dials, concentric recording type wheels, mechanism for rotating the type wheels when the dials rotate, a reciprocating mechanism for pressing a strip against the type wheels and reciprocating printing type adapted to print upon the strip before said reciprocating mechanism presses the strip against said type wheels.

31. In a device of the class described concentric dials, concentric type wheels, mechanism for rotating the type wheels when the dials rotate, a reciprocating mechanism for pressing a strip against the type wheels, type bars adapted to print on the strip, levers for operating said type bars, and indicating dials actuated by rotation of the concentric dials for indicating the sum recorded.

32. In a device of the class described actuating dials, type wheels actuated thereby, a reciprocating frame, an impression roller carried thereby adapted to press a strip against the type wheels, a mechanism for shifting the reciprocating frame to make the record, and means operated by rotation of the dials for actuating said mechanism.

33. In a device of the class described actuating members, type wheels set to recording position thereby, a sliding mechanism for pressing a strip against the type wheels, mechanism for actuating the sliding mechanism in one direction, an independent printing mechanism for indicating the nature of the transaction on the strip, an inking mechanism for the type wheels and an automatically acting inking mechanism for the independent printing mechanism.

34. In a device of the class described concentric interfitting dials, concentric shafts connected thereto, concentric recording shafts, gears connecting the dial shafts and the recording shafts, a printing wheel on each recording shaft, mechanism for pressing a recording strip against the printing wheels, printing type adapted to print upon the strip before the same is pressed against the printing wheels, and levers extending through the machine and positioned below the dials for actuating said printing type.

35. In a device of the class described rotating dials, printing wheels rotatable therewith, mechanism for taking an impression from the printing wheels when the same are rotated to recording position, springs for automatically returning the dials and printing wheels to normal after each record, and indicator wheels actuated by the dials as they return to normal to indicate the amount recorded.

36. In a device of the class described concentric shafts, an actuating lever secured to one, dials secured to the other shafts, concentric recording shafts parallel the dial shafts, printing wheels thereon, gears connecting the sets of shafts except the lever shaft, a mechanism for forcing a strip strip against the printing wheels, a rock shaft journaled below the dial shafts, means secured thereto for actuating the mechanism in one direction, and means operated by the lever shaft for actuating the rock shaft.

37. In a device of the class described concentric interfitting dials, concentric shafts connected thereto, concentric recording shafts, gears connecting the dial shafts and the printing shafts, recording wheels on each recording shaft, mechanism for pressing a recording strip against the printing wheels, printing type adapted to print upon the strip before the same is pressed against the printing wheels, levers extending through the machine and positioned below the dials for actuating said printing type, an inking mechanism for the printing wheels, and an automatically acting inking mechanism for the printing type.

38. In a device of the class described concentric dials, concentric type wheels, mechanism for rotating the type wheels when the dials rotate, a reciprocating mechanism for pressing a strip against the type wheels, an arm secured thereto for reciprocating the pressing mechanism, and means rotatable with the dials for actuating said shaft.

39. In a device of the class described actuating dials, type wheels actuated thereby, a reciprocating frame, an impression roller carried thereby adapted to press a strip against the type wheels, a mechanism for shifting the reciprocating frame to make the record, means operated by rotation of the dials for actuating said mechanism, means for releasing said mechanism from the frame, and a spring for automatically returning the frame and impression roller to normal.

40. In a device of the class described concentric dials, concentric type wheels, mechanism for rotating the type wheels when the dials rotate, a reciprocating mechanism for pressing a strip against the type wheels, a shaft, an arm secured thereto for reciprocating the pressing mechanism, means rotatable with the dials for actuating said shaft, means for automatically returning the shaft to normal and means for automatically returning the pressing mechanism to normal.

41. In a device of the class described concentric dials, concentric shafts connected thereto, concentric type wheels, concentric shafts connected to the type wheels, gears connecting the shafts, an actuating shaft, a lever secured thereto for rotating the dials, a reciprocating mechanism for pressing a recording strip against the type wheels, an oscillating mechanism for reciprocating said mechanism, an oscillating shaft, an arm on each end thereof, one for actuating the oscillating mechanism, means operated by the actuating shaft for engaging the other arm and oscillating the shaft, and lever operated independent printing members for printing the nature of the record on the strip.

42. In a device of the class described a plurality of sets of concentric shafts, actuating dials on one set, printing wheels on another set, and indicator dials on another set, gears connecting the sets of shafts to operate by actuation of the dial shafts to set the printing wheels to recording position and to set the indicator dials to indicate the amount recorded, and a mechanism carrying a strip adapted to press the same against the printing wheels to make a permanent record.

43. In a device of the class described a plurality of rotatable dials, printing wheels rotatable therewith, a mechanism for pressing a strip against the printing wheels, a mechanism for actuating the same having a loose connection therewith and cams for releasing the actuating mechanism from the pressing mechanism after the record has been made.

44. In a device of the class described actuating dials, shafts driven thereby, printing wheels on said shafts, impression mechanism for pressing a recording strip against the printing wheels, reciprocating type bars adapted to print on the record strip, and levers for actuating the same having markings thereon corresponding to the markings on the type bar.

45. In a device of the class described a plurality of sets of concentric shafts, actuating dials on one set, printing wheels on another set and indicator dials on another set, gears connecting the sets of shafts to operate by actuation of the dial shafts to set the printing wheels to recording position and to set the indicator dials to indicate the amount recorded, a mechanism carrying a strip adapted to press the same against the printing wheels to make a permanent record, and mechanisms controlled by rotation of the dials for actuating the strip carrying mechanism and releasing the indicator dials to return to normal.

46. In a device of the class described concentric and interfitting actuating dials, concentric printing wheels geared to rotate by rotation of the dials, a mechanism for pressing a recording strip against the wheels, means operated by rotation of the dials for actuating said mechanism to press the recording strip against the wheels when the dials have been adjusted to their limit of rotation, and a spring for returning the mechanism to normal after each recording.

47. In a device of the class described concentric and interfitting rotating dials, concentric printing wheels rotatable therewith, mechanism for taking an impression from the printing wheels when the same are rotated to printing position, and springs for automatically returning the dials and recording wheels to normal after each record.

48. In a device of the class described concentric shafts, an actuating lever secured to one, dials secured to the other shafts, concentric printing shafts parallel the dial shafts, printing wheels thereon, gears connecting the sets of shafts except the lever shaft, a mechanism for forcing a strip against the printing wheels, a rock shaft journaled below the dial shafts, means secured thereto for actuating the mechanism in one direction, means operated by the lever shaft for actuating the rock shaft, a spring for returning the rock shaft to normal after each operation, and a spring for returning the mechanism to normal after pressing the strip against the printing wheels.

49. In a device of the class described concentric dials, concentric type wheels, mechanism for rotating the type wheels when the dials rotate, a reciprocating mechanism for pressing a strip against the type wheels, type bars adapted to print on the strip and levers for operating said type bars.

50. In a device of the class described a plurality of dials, means acting to advance a recording strip, printing wheels from which an impression is made on said strip, printing mechanism for indicating the nature of the transaction on the strip, and marked levers projecting through the casing for actuating the printing mechanism to make a record on the strip.

51. In a device of the class described actuating members, type wheels set to recording position thereby, a sliding mechanism for pressing a strip against the type wheels, mechanism for actuating the sliding mechanism in one direction to make the record, a roller for receiving the strip, a roller for winding the strip thereon from the aforesaid roller, and mechanism operated by the actuating mechanism for rotating said winding roller.

52. In a device of the class described concentric dials, concentric type wheels, mechanism for rotating the type wheels when the dials rotate, a reciprocating mechanism for pressing a strip against the type wheels, type bars adapted to print on the strip, levers for operating said type bars, and independent automatic inking devices for the type wheels and type bars.

53. In a device of the class described actuating dials, type wheels actuated thereby, a reciprocating frame, an impression roller carried thereby adapted to press a strip against the type wheels, a mechanism for shifting the sliding frame to make the record, means operated by rotation of the dials for actuating said mechanism, means for releasing said mechanism from the frame, a spring for automatically returning the frame and impression roller to normal, and lever operated type members for printing on the strip the nature of the transaction recorded.

54. In a device of the class described concentric dials, concentric type wheels, mechanism for rotating the type wheels when the dials rotate, a reciprocating mechanism for pressing a strip against the type wheels, type bars adapted to print on the strip, levers for operating said type bars, indicating dials actuated by rotation of the concentric dials for indicating the sum recorded, springs adapted to return the indicator dials to normal, but normally held from action, and mechanism operated simultaneously with the forward rotation of the dials for actuating the mechanism for pressing the strip against the type wheels and for releasing the springs to return the dials to normal.

55. In a recording mechanism rotatable printing wheels, a mechanism supporting a strip to receive impressions from the printing wheels, reciprocating printing devices for printing the nature of the transaction on the strip, means for reciprocating the mechanism for pressing the strip against the printing wheels and to feed the recording strip, mechanism for winding the recording strip thus fed, a release device for releasing the reciprocating means from said mechanism after each record has been taken, means for automatically returning the mechanism to normal, and independent inking devices for the printing wheels and reciprocating printing devices.

56. In a device of the class described concentric dials, concentric shafts connected thereto, concentric type wheels, concentric shafts connected to the type wheels, gears connecting the shafts, an actuating shaft, a lever secured thereto for rotating the dials, a reciprocating mechanism for pressing a recording strip against the type wheels, an oscillating mechanism for reciprocating said mechanism, an oscillating shaft, an arm on each end thereof, one for actuating the oscillating mechanism, and means operated by the actuating shaft for engaging the other arm and oscillating the shaft.

57. In a device of the class described actuating dials, shafts driven thereby, printing wheels on said shafts, impression mechanism for pressing a recording strip against the printing wheels, reciprocating type bars adapted to print on the record strip, levers for actuating the same having markings thereon corresponding to the markings on the type bar, and an inking roller for the type bars adapted to be actuated to clear the type faces by actuation of the type bars.

58. In a device of the class described a plurality of rotatable dials, printing wheels rotatable therewith, a mechanism for pressing a strip against the printing wheels, a mechanism for actuating the same having a loose connection therewith, cams for releasing the actuating mechanism from the pressing mechanism after the record has been made, a spring for returning the pressing mechanism to normal, and a counterweight for returning the actuating mechanism to normal and at the same time winding up the recording strip.

59. In a device of the class described actuating dials, printing wheels operated thereby, printing members adapted to be operated independently of the dials, means for feeding a strip of recording material to receive the impression of the wheels and printing members thereon, means adapted to advance said strip during each printing operation of the printing wheels, indicating wheels operated by the dials to indicate each amount recorded, and mechanism operated by the dials for controlling the operation of the strip and the operation of the indicating wheels.

60. In a device of the class described actuating members, type wheels set to recording position thereby, a sliding mechanism for pressing a strip against the type wheels, mechanism for actuating the sliding mechanism in one direction to make the record, a roller for receiving the strip, a roller for winding the strip thereon from the aforesaid roller, mechanism operated by the actuating mechanism for rotating said winding roller, and a plurality of independent printing members adapted to be manually operated to print on the strip.

61. In a recording mechanism rotatable printing wheels, a mechanism supporting a strip to receive impressions from the printing wheels, reciprocating printing devices for printing the nature of the transaction on the strip, means for reciprocating the mechanism for pressing the strip against the printing wheels, and to feed the recording strip, mechanism for winding the recording strip thus fed, a release device for releasing the reciprocating means from said mechanism after each record has been taken, and means for automatically returning the mechanism to normal.

62. In a device of the class described actuating dials, printing wheels operated thereby, independent printing members adapted to be operated independently of the dials, means acting to feed a strip of recording material to receive the impression of the wheels, and independent printing members thereon, and means adapted to advance said strip during each printing operation of the printing wheels.

63. In a device of the class described concentric dials, concentric shafts connected thereto, concentric type wheels, concentric shafts connected to the type wheels, gears connecting the shafts, an actuating shaft, a lever secured thereto for rotating the dials, a reciprocating mechanism for pressing a recording strip against the type wheels, an oscillating mechanism for reciprocating said mechanism, an oscillating shaft, an arm on each end thereof, one for actuating the oscillating mechanism, means operated by the actuating shaft for engaging the other arm, and oscillating the shaft, concentric indicator wheels, concentric shafts connected thereto, and a transmission mechanism connecting the same and the dial shafts.

64. In a device of the class described a plurality of sets of concentric shafts, actuating dials on one set, printing wheels on another set and indicator dials on another set, gears connecting the sets of shafts to operate by actuation of the dial shafts to set the printing wheels to recording position and to set the indicator dials to indicate the amount recorded, a mechanism carrying a strip adapted to press the same against the printing wheels to make a permanent record, and type members having marked thereon "Received on Account" and "Paid Out", etc., adapted to print on the recording strip to indicate the nature of the transaction.

65. In a device of the class described actuating dials, printing wheels operated thereby, printing members adapted to be operated independently of the dials, means for feeding a strip of recording material to receive the impression of the wheels and printing members thereon, means adapted to advance said strip during each printing operation of the printing wheels, and indicating wheels operated by the dials to indicate each amount recorded.

66. In a device of the class described a plurality of sets of concentric shafts, dials on one set of shafts, printing wheels on another set of shafts, and indicating wheels connected with the other set of shafts and gears connecting the shafts whereby the printing wheels and the indicating wheels are rotated into position to make the proper record and to indicate the proper sum.

67. In a device of the class described a plurality of sets of concentric shafts connected to rotate together in one direction, dials secured to one set of shafts, indicator wheels connected to another set of shafts and printing wheels connected to another set of shafts.

68. In a device of the class described a plurality of sets of concentric shafts, two of said sets connected to rotate together in both directions and another set connected to rotate therewith only when they rotate in one direction, dials on one of said sets of shafts, printing wheels on the other of said sets of shafts and indicating wheels on another of said sets of shafts and mechanism carrying a recording strip to receive the record from the printing wheels.

69. In a device of the class described a plurality of sets of concentric shafts, dials on one set of shafts, printing wheels on another set of shafts, indicating wheels connected with the other set of shafts, gears connecting the shafts whereby the printing wheels and the indicating wheels are rotated into position to make the proper record and to indicate the proper sum, a mechanism for releasing the connection between the dial shafts and indicators and springs for returning the indicators to normal.

70. In a device of the class described a plurality of sets of concentric shafts, two of said sets connected to rotate together in both directions and another set connected to rotate therewith only when they rotate in one direction, dials on one of said sets of shafts, printing wheels on the other of said sets of shafts and indicating wheels on another of said sets of shafts, mechanism carrying a recording strip to receive the record from the printing wheels, springs for automatically rotating the dials and printing wheels to normal after each actuation and springs for returning the indicator wheels to normal prior to each indication of any transaction.

71. In a device of the class described a plurality of sets of concentric shafts, dials on one set of shafts, printing wheels on another set of shafts, indicating wheels connected with the other set of shafts, gears connecting the shafts whereby the printing wheels and the indicating wheels are rotated into position to make the proper record and to indicate the proper sum, and mechanism for pressing a recording strip against the printing wheels.

72. In a device of the class described a plurality of sets of concentric shafts, two of said sets connected to rotate together in both directions and another set connected to rotate therewith only when they rotate in one direction, dials on one of said sets of shafts, printing wheels on the other of said sets of shafts, and indicating wheels on another of said sets of shafts, mechanism carrying a recording strip to receive the record from the printing wheels, and printing members adapted to be pressed upon the strip to indicate the nature of each transaction.

73. In a device of the class described a plurality of sets of concentric shafts, dials on one set of shafts, printing wheels on another set of shafts and indicating wheels connected with the other set of shafts, gears connecting the shafts whereby the printing wheels and the indicating wheels are rotated into position to make the proper record and to indicate the proper sum, a mechanism for releasing the connection between the dial shafts and indicators, springs for returning the indicators to normal and mechanism for pressing a recording strip against the printing wheels.

74. In a device of the class described a plurality of sets of concentric shafts, dials on one set of shafts, printing wheels on another set of shafts and indicating wheels connected with the other set of shafts, gears connecting the shafts whereby the printing wheels and the indicating wheels are rotated into position to make the proper record and to indicate the proper sum, a mechanism for releasing the connection between the dial shafts and indicators, springs for returning the indicators to normal, mechanism for pressing a recording strip against the printing wheels, an actuating shaft extending through the dial shafts, an actuating lever thereon for rotating the dials, and means on the actuating shaft for operating the releasing mechanism and for operating the pressing mechanism.

75. In a device of the class described a plurality of sets of concentric shafts, dials on one set of shafts, printing wheels on another set of shafts, indicating wheels connected with the other set of shafts, gears connecting the shafts whereby the printing wheels and the indicating wheels are rotated into position to make the proper record and to indicate the proper sum, mechanism for pressing a recording strip against the printing wheels, springs for rotating the dials in one direction and thereby effecting the return of the printing wheels to normal position, and independent springs for rotating the indicators in one direction.

76. In a sales recording device of the class described concentric and interfitting rotating dials, shafts connected thereto, a printing mechanism operated by rotation of the dials to make a printed record of the sales, and indicating dials connected with the rotary dials and actuated as they return to normal position to indicate the transaction recorded.

In testimony whereof I have hereunto subscribed my name in the presence of two subscribing witnesses.

CHARLES SULFER.

Witnesses:
K. E. HANNAH,
J. W. ANGELL.

Copies of this patent may be obtained for five cents each, by addressing the "Commissioner of Patents, Washington, D. C."